United States Patent
Lin

(10) Patent No.: US 8,747,150 B1
(45) Date of Patent: Jun. 10, 2014

(54) MULTIDIRECTIONAL MODULAR JACK AND FACE PANEL MOUNTING STRUCTURE

(71) Applicant: Jyh Eng Technology Co., Ltd., New Taipei (TW)

(72) Inventor: Yen-Lin Lin, New Taipei (TW)

(73) Assignee: Jyh Eng Technology Co., Ltd., New Taipei (TW)

( * ) Notice: Subject to any disclaimer, the term of this patent is extended or adjusted under 35 U.S.C. 154(b) by 8 days.

(21) Appl. No.: 13/726,443

(22) Filed: Dec. 24, 2012

(51) Int. Cl.
*H01R 27/00* (2006.01)

(52) U.S. Cl.
USPC ........................................ 439/540.1; 439/954

(58) Field of Classification Search
USPC ........... 439/218, 640, 11, 620, 851, 850, 660, 439/540.1, 954
See application file for complete search history.

(56) References Cited

U.S. PATENT DOCUMENTS

| | | | | |
|---|---|---|---|---|
| 5,129,842 | A * | 7/1992 | Morgan et al. | 439/532 |
| 6,866,541 | B2 * | 3/2005 | Barker et al. | 439/540.1 |
| 6,918,786 | B2 * | 7/2005 | Barker et al. | 439/540.1 |
| 6,981,893 | B2 * | 1/2006 | Barker et al. | 439/540.1 |
| 7,094,095 | B1 * | 8/2006 | Caveney | 439/540.1 |
| 7,179,119 | B2 * | 2/2007 | Follingstad | 439/534 |
| 7,241,182 | B2 * | 7/2007 | Clark et al. | 439/676 |
| 7,762,839 | B2 | 7/2010 | Chen | |

* cited by examiner

*Primary Examiner* — Neil Abrams
*Assistant Examiner* — Phuongchi T Nguyen
(74) *Attorney, Agent, or Firm* — Guice Patents PLLC

(57) ABSTRACT

A multidirectional modular jack and face panel mounting structure includes a face panel including a row of modular jack mounting holes and a modular jack engagement structure around each modular jack mounting hole, and modular jacks respectively mounted in the modular jack mounting holes, each modular jack including an IDC housing configured for mounting in one respective modular jack mounting hole in one of a series of angular positions and face panel engagement structures disposed around the IDC housing for engagement with the modular jack engagement structure around the respective modular jack mounting hole of the face panel.

22 Claims, 9 Drawing Sheets

MULTIDIRECTIONAL MODULAR JACK AND FACE PANEL MOUNTING STRUCTURE

BACKGROUND OF THE INVENTION

1. Field of the Invention

The present invention relates the mounting arrangement between a face panel and modular jacks and more particular, to a multidirectional modular jack and face panel mounting structure, which allows modular jacks to be installed respective mounting through holes of a face panel in one of a series of angular positions.

2. Description of the Related Art

When arranging a local area network in a building, optical fiber cables or electrical cables are extended from a server room in the building to modular jacks in the walls at different rooms and different floors of the building so that computers in each room of the building can be connected to the adjacent modular jacks by modular plugs of computer cables.

In the server room, racks are installed to support network switches, servers and other devices. The servers in one rack are electrically connected to a face panel of the respective rack. The face panels of all racks in the server room are electrically connected by network cables.

However, with increase in office business and office personnel and rapid development of network communication technology, some problems may follow. The existing capacity of the network equipment in the server room may be insufficient to meet the needs of the company. However, adding extra network equipment to expand the capacity requires much server room installation space. Using small sized network equipment can save server room space.

When installing multiple network equipments in a limited server room, patch cords may have to be bent into a curved condition to reduce space occupation. However, a large angle bending of patch cords may break the core wires.

To avoid over-bending of patch cords U.S. Pat. No. 6,866,541 discloses an angled patch panel with cable support bar for network cable racks. According to this design, the patch panel includes a patch panel frame and rack mounting plates. The frame forms a central section having a longitudinal width sized to fit within the network rack. The rack mounting plates are provided on opposite longitudinal ends of the central section and allow the panel to be mounted to a network rack. The central section includes two panel sections angled outwardly in an inverted V-shapes, and the central section has mounted thereon a plurality of cable connectors that receive cabling on the front side and the rear side of the patch panel frame. Each connector has a horizontal axis. According to this design, angled patch panel simply allows module jacks to be arranged at right angles. When connecting module plugs of network cables to the module jacks at the angled patch panel, the network cables can simply be extended in two directions. Further, a server rack fitting the angled patch panel must be designed having an extended depth, increasing space occupation. Therefore, this design is not conducive for high-density installation.

U.S. Pat. No. 7,762,839 discloses a patch panel assembly including an angle module having one or more RJ modules, one or more insulation displacement contact (IDC) modules and a printed circuit board. According to this design, all RJ modules keep the plug receiving holes thereof in one same direction after installation. When connecting RJ plugs of network cables from different directions to the RJ modules, the extending directions of the network cables have to be changed to fit the extending direction of the plug receiving holes of the RJ modules.

SUMMARY OF THE INVENTION

The present invention has been accomplished under the circumstances in view. It is one object of the present invention to provide a multidirectional modular jack and face panel mounting structure, which allows modular jacks to be installed respective mounting through holes of a face panel in one of a series of angular positions and, which is practical for use in a network equipment to have all network cables be properly arranged in different directions, avoiding network cable damage or tangled network cables.

To achieve this and other objects of the present invention, a multidirectional modular jack and face panel mounting structure comprises a face panel and a plurality of modular jacks. The face panel comprises a front face layer, a row of modular jack mounting holes cut through the front face layer, and multiple modular jack engagement structures respectively disposed adjacent to the modular jack mounting holes. The modular jacks are respectively mounted in the modular jack mounting holes of the face panel, each comprising an IDC housing and a face panel engagement structure disposed around the IDC housing for engagement with one modular jack engagement structure of the face panel. The IDC housing comprises a tilted modular plug insertion hole located at a front side thereof and exposed outside the front face layer of the face panel. Further, the IDC housing is configured to fit the configuration of the modular jack mounting holes so that each modular jack is selectively mountable in one modular jack mounting hole in one of a series of angular positions.

Further, the face panel comprises a back lining layer fixedly mounted at a back side of the front face layer. The front face layer of the face panel comprises an elongated slot. The back lining layer comprises a plurality of window openings kept in communication with the elongated slot. Each window opening is combined with a part of the elongated slot to form one respective modular jack mounting hole.

Further, the IDC housings of the modular jacks can made in a square shape, rectangular shape, circular shape or any of a variety of other geometric shapes, and the window openings of the face panel can be formed of two openings that are overlapped together and biased relative to each other at a predetermined angle for accommodating the IDC housings of the modular jacks in one of a series of angular positions.

Further, in one example of the present invention, the window opening is formed of two square or rectangular holes that are overlapped together and biased at a 45 or 90 degree angle relative to each other.

Further, in one example of the present invention, each modular jack engagement structure of the face panel comprises a plurality of hook rods located at the back side of the back lining layer adjacent to around one window opening; each face panel engagement structure of the IDC housing of each modular jack comprises a plurality of hook grooves disposed at the peripheral walls thereof for engagement with the hook rods of one modular jack engagement structure of the face panel.

Further, in another example of the present invention, the window openings of the face panel are composite window openings; each face panel engagement structure of the IDC housing of each modular jack comprises a plurality of retaining blocks located at opposing top and bottom walls thereof and forced into engagement with an outer surface of the back lining layer of the face panel around one composite window opening, and two transverse locating ribs respectively located at two opposing sidewalls thereof and stopped at an inner surface of the back lining layer around the respective composite window opening.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
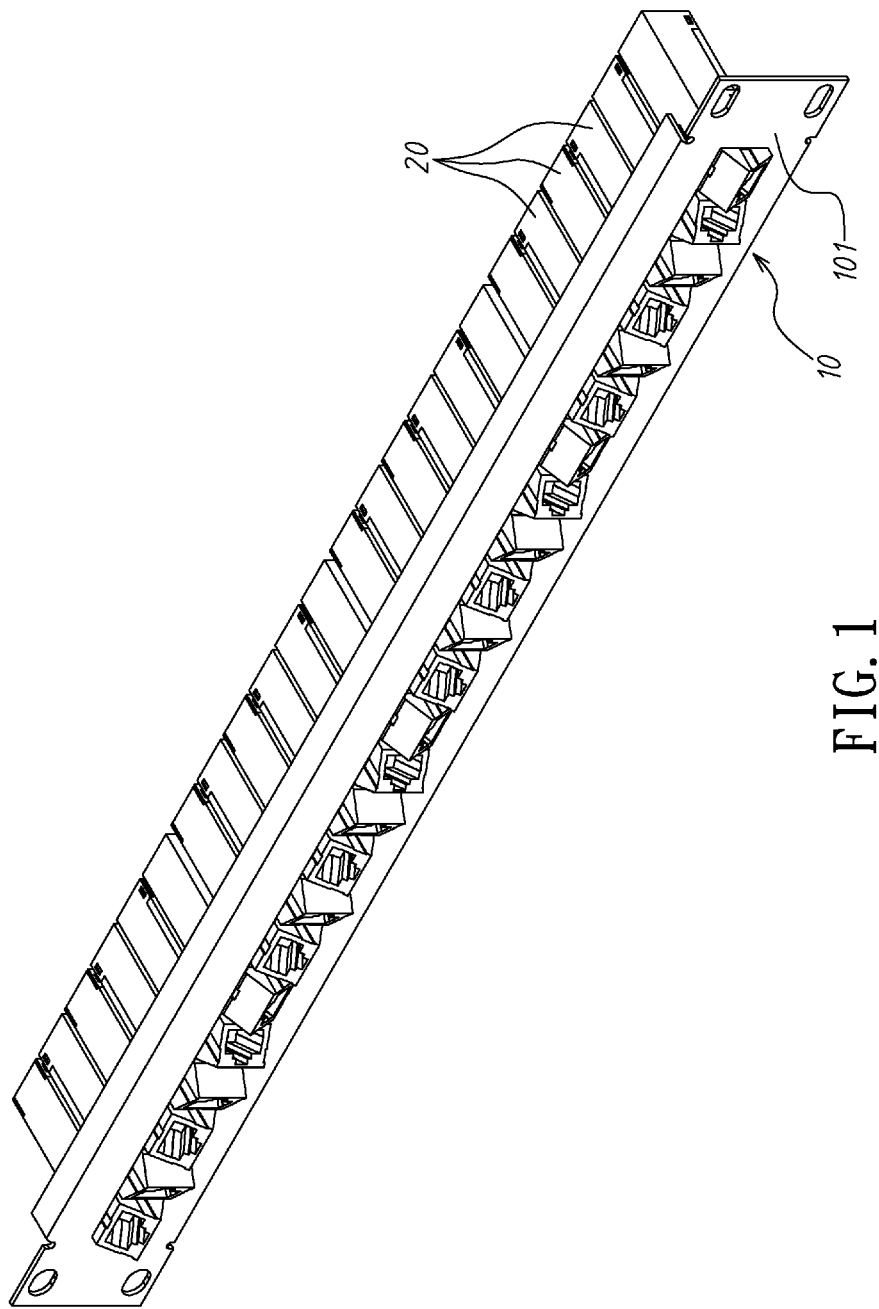
FIG. 1 is an elevational assembly view of a multidirectional modular jack and face panel mounting structure in accordance with the present invention.

Referring to FIG. 1, a multidirectional modular jack and face panel mounting structure in accordance with the present invention is shown comprising a face panel 10, and a plurality of modular jacks 20 mounted in the face panel 10 in a row.

Figure 2:
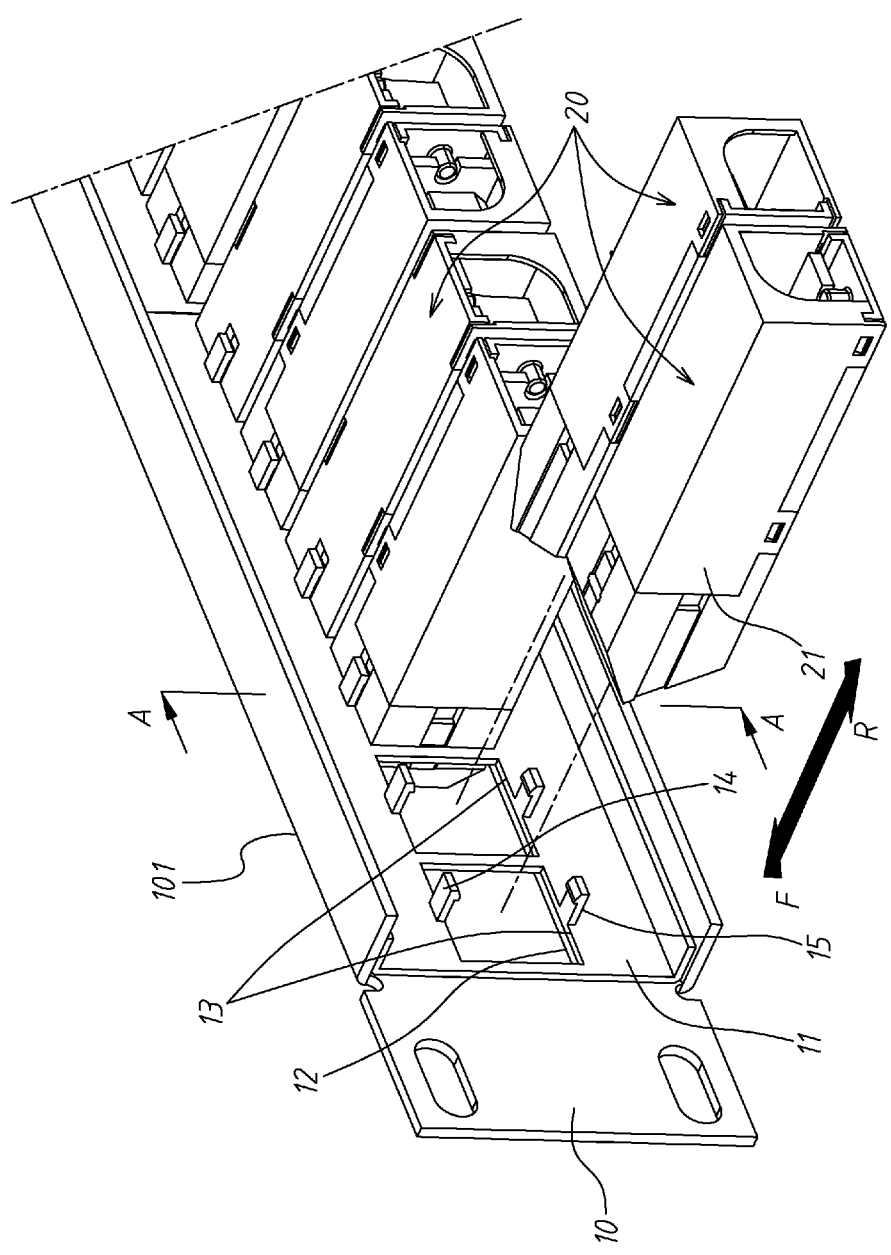
FIG. 2 is an exploded view, in an enlarged scale, of a part of FIG. 1.
Figure 3:
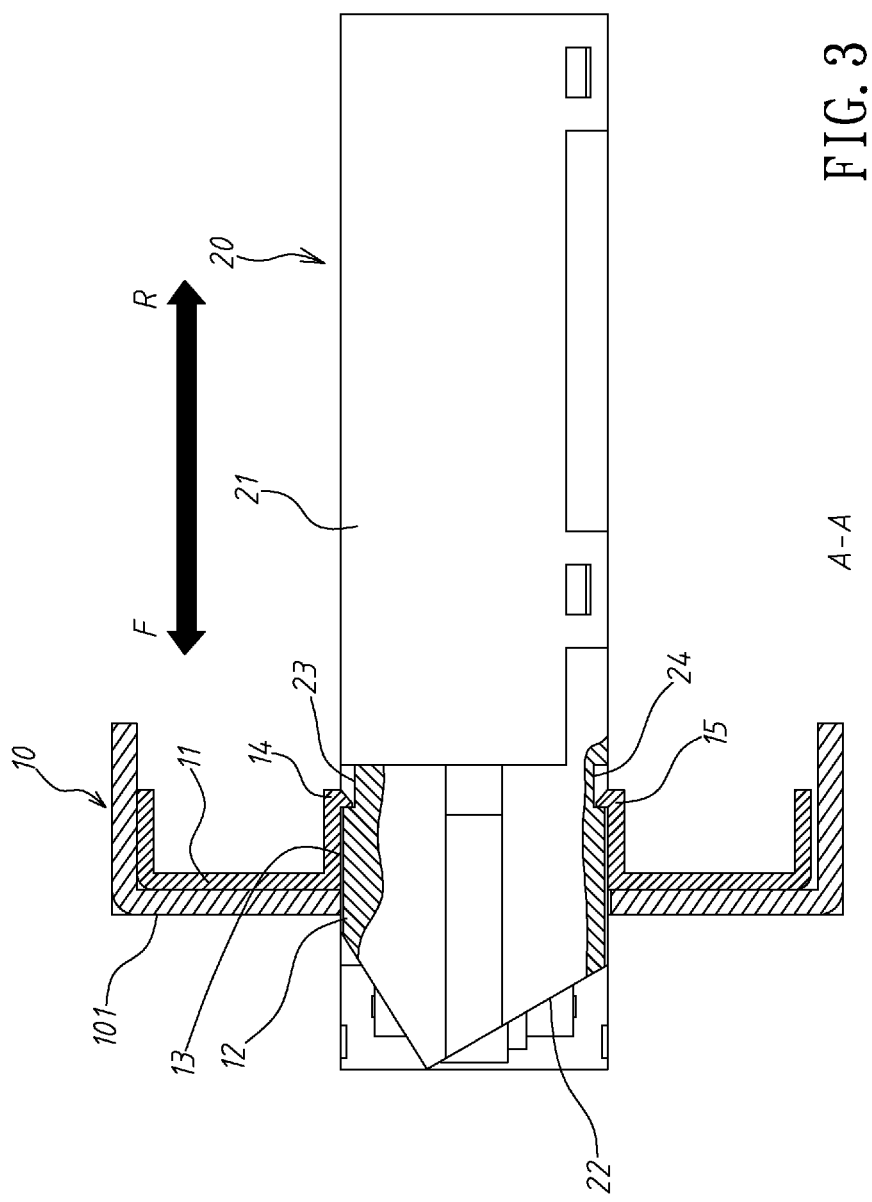
FIG. 3 is a sectional view taken along line A-A of FIG. 2.
Figure 4:
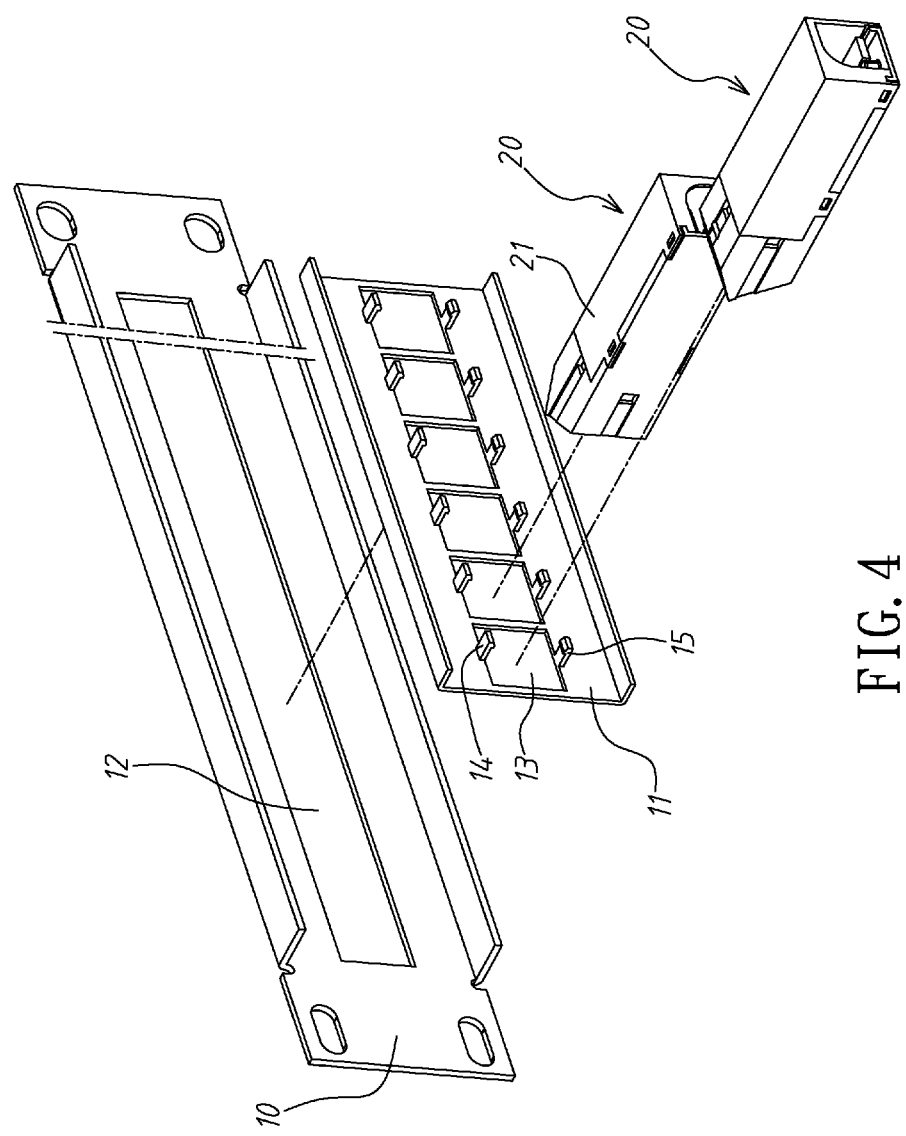
FIG. 4 is an exploded view of a part of the multidirectional modular jack and face panel mounting structure in accordance with the present invention.

Referring to FIGS. 2, 3 and 4, the face panel 10 comprises a front face layer 101 made of a metal material, and a back lining layer 11 made out of a plastic material using a molding technique and fixedly attached to the back side of the front face layer 101. In this embodiment, the front face layer 101 of the face panel 10 is punched to provide an elongated slot 12. The back lining layer 11 comprises a row of equally spaced window openings 13 corresponding to the elongated slot 12 of the front face layer 101 for receiving the modular jacks 20 that extend in F-R direction (see FIG. 2), and a plurality of modular jack engagement structures for securing the modular jacks 20 in the respective window openings 13 and the elongated slot 12. The window openings 13 and the elongated slot 12 are combined together, forming a plurality of modular jack mounting holes. Further, each modular jack engagement structure comprises opposing top and bottom hook rods 14 and 15 respectively perpendicularly extended from the back wall of the back lining layer 11 at top and bottom sides of each respective window opening 13.

Each modular jack 20 comprises an IDC (Insulation Displacement Connection) housing 21, an IDC terminal block (not shown) mounted in the IDC housing 21, a plurality of IDC terminals (not shown) mounted in the IDC terminal block and respectively electrically connected with respective core wires of a network cable (not shown). The cross section of the IDC housing 21 is configured to fit the combined shape of each window opening 13 and the elongated slot 12. In this embodiment, the IDC housings 21 of the modular jacks 20 and the window opening 13 have a rectangular cross section. However, this configuration is simply an example but not a limitation.

Figure 5:
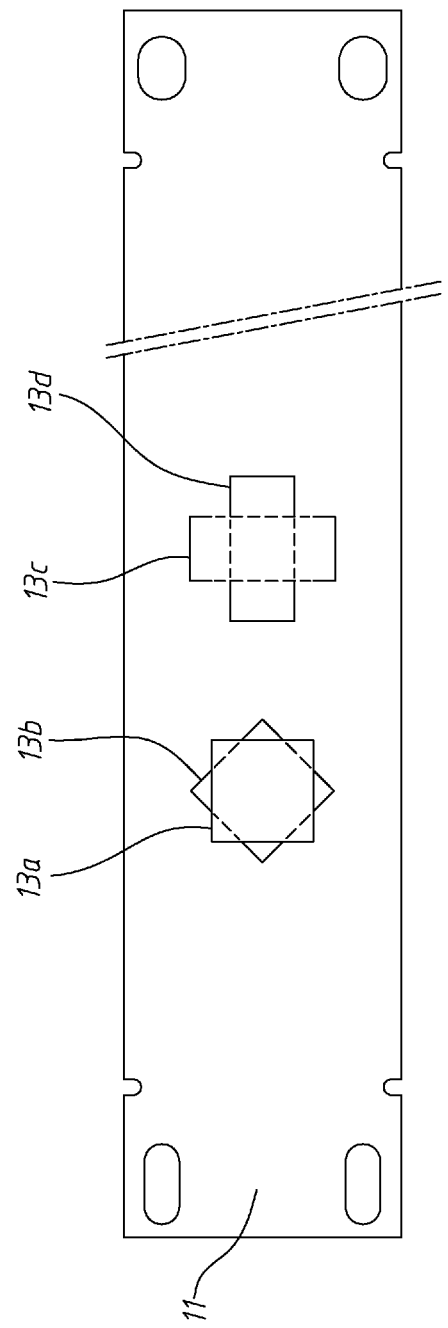
FIG. 5 is a schematic drawing illustrating different shapes of window openings of the back lining layer of the face panel of the multidirectional modular jack and face panel mounting structure in accordance with the present invention.

As shown in FIG. 5, the IDC housings 21 of the modular jacks 20 can made having a square cross section; the window openings 13 can star shaped, each formed of two square holes 13a and 13b that are overlapped together and biased at a 45 degree angle relative to each other. Thus, there are 8 installation directions for selection. Alternatively, the IDC housings 21 of the modular jacks 20 can made having a rectangular cross section; the window openings 13 can be respectively formed of two rectangular holes 13c and 13d that extend across each other at right angles. In general, the IDC housings 21 of the modular jacks 20 can made in a square shape, rectangular shape, circular shape or any of a variety of other geometric shapes, and the window openings 13 can be formed of two openings that are overlapped together and biased relative to each other at a predetermined angle for accommodating the IDC housings 21 of the modular jacks 20 in one of a series of angular positions.

Figure 6:
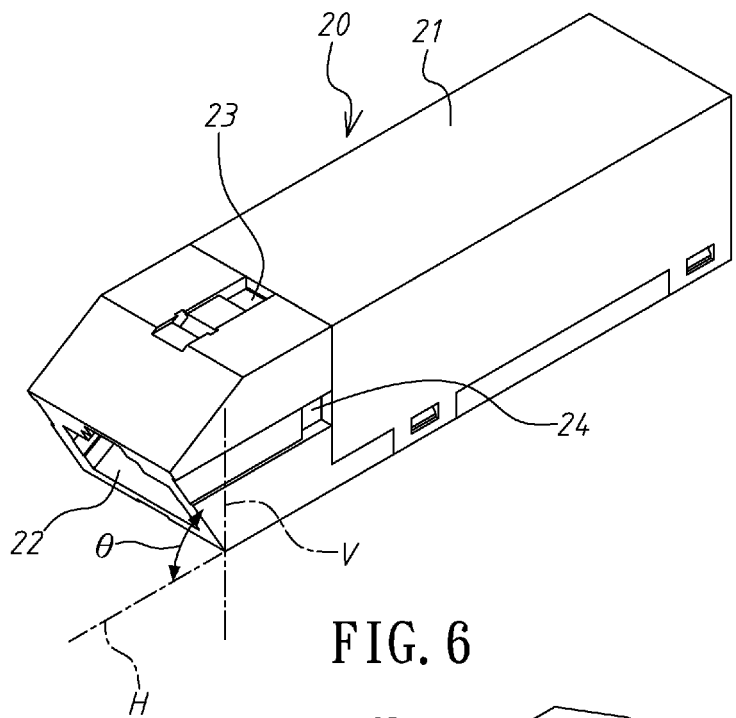
FIG. 6 is an elevational view of one modular jack of the multidirectional modular jack and face panel mounting structure in accordance with the present invention.
Figure 7:
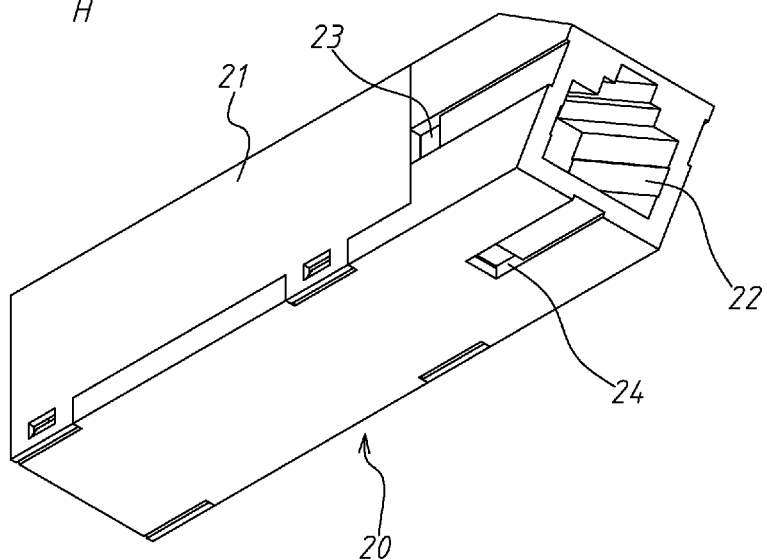
FIG. 7 corresponds to FIG. 6 when viewed from another angle.

Referring to FIGS. 6 and 7, the IDC housing 21 of each modular jack 20 defines a tilted modular plug insertion hole 22 at the front side thereof. After installation of one modular jack 20 in one respective window opening 13 of the back lining layer 11 and the elongated slot 12 of the front face layer 101 of the face panel 10, the tilted modular plug insertion hole 22 of the installed modular jack 20 is exposed to the outside the face panel 10 for the insertion of a modular plug (not shown). The so-called "tilted" means that the tilted modular plug insertion hole 22 is not at the vertical line V, it defines with the horizontal line H a predetermined contained angle θ.

Further, in this embodiment, the IDC housing 21 of each modular jack 20 comprises opposing top and bottom walls and two opposing sidewalls, two first hook grooves 23 respectively located at the opposing top and bottom walls thereof, and two second hook grooves 24 respectively located at the opposing sidewalls thereof.

That is, the IDC housing 21 of each modular jack 20 comprises a face panel engagement structure disposed between the front side F (in direction toward the face panel) and rear side R (opposite to the front side) thereof for engagement with one modular jack engagement structure of the face panel 10. Further, the IDC housing 21 defines a first axial direction extending from its front side toward its rear side (in parallel to the horizontal line H), and a second axial direction extending along the tilted modular plug insertion hole 22 and defining with the first axial direction a contained angle.

Figure 8:
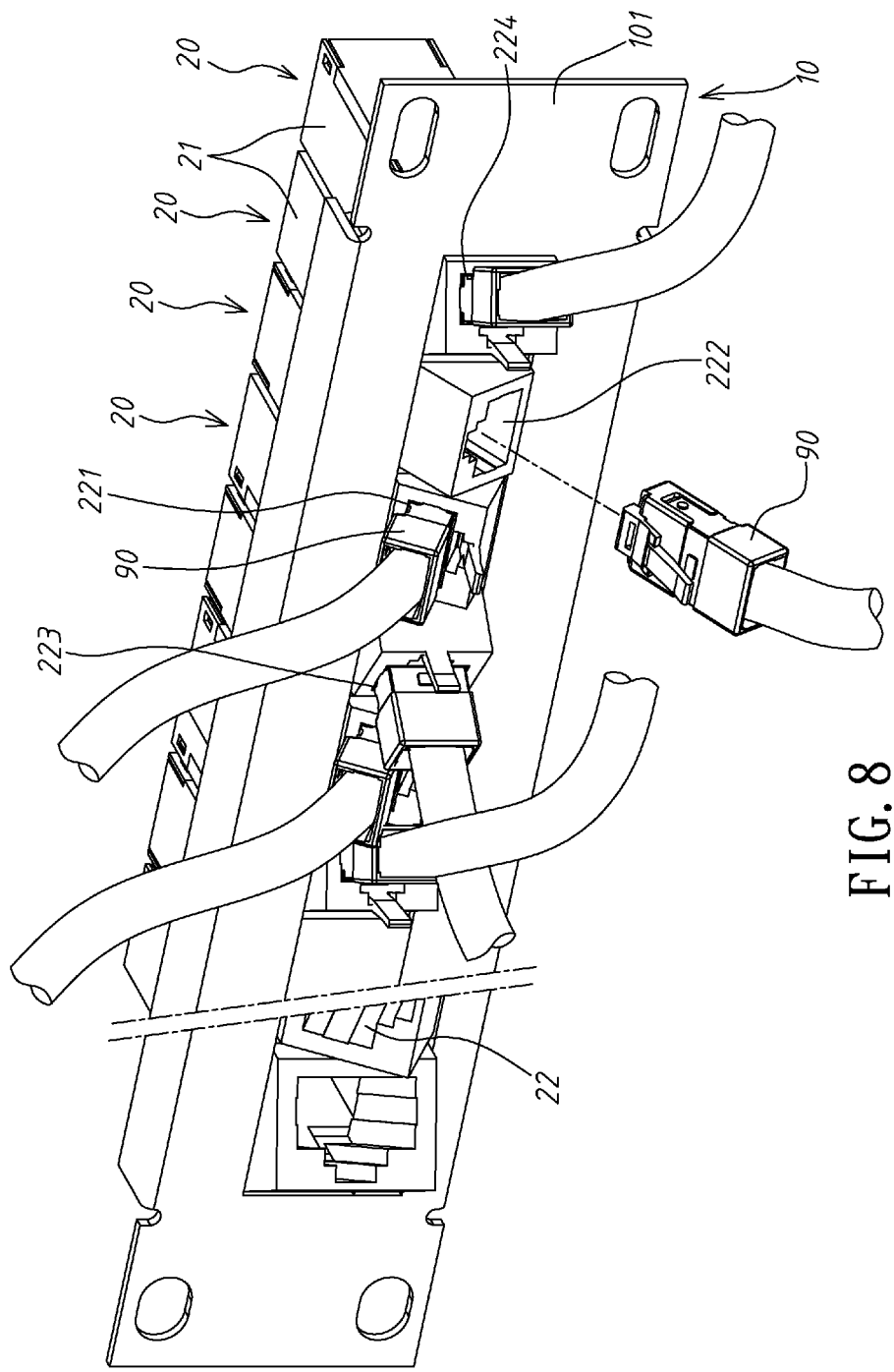
FIG. 8 is a schematic drawing illustrating an application example of the multidirectional modular jack and face panel mounting structure in accordance with the present invention.

Referring to FIG. 8 and FIGS. 6 and 7 again, the IDC housings 21 of the modular jacks 20 can be selectively mounted in the window openings 13 of the back lining layer 11 and the elongated slot 12 of the front face layer 101 of the face panel 10 in one of a series of angular positions for enabling respective mating modular plugs 90 to be inserted into the tilted modular plug insertion hole 22 of the modular jacks 20 in the face panel 10 at different angles. For example, the IDC housing 21 of each modular jack 20 can be selectively mounted in one window opening 13 of the back lining layer 11 and the elongated slot 12 of the front face layer 101 of the face panel 10 in a first position where the IDC housing 21 has its top wall facing down, its bottom wall facing up and its first hook grooves 23 respectively kept in engagement with the opposing top and bottom hook rods 14 and 15 of the respective modular jack engagement structure and the tilted modular plug insertion hole 221 kept extending obliquely upward, or in a second position biased from the first position at 90-degree angle where the IDC housing 21 has its opposing top wall facing leftward and its bottom wall facing rightward and its second hook grooves 24 respectively kept in engagement with the opposing top and bottom hook rods 14 and 15 of the respective modular jack engagement structure and the tilted modular plug insertion hole 223 kept extending obliquely leftward, or in a third position biased from the second position at 90-degree angle where the IDC housing 21 has its opposing top wall facing down and its bottom wall facing up and its first hook grooves 23 respectively kept in engagement with the opposing top and bottom hook rods 14 and 15 of the respective modular jack engagement structure and the tilted modular plug insertion hole 222 kept extending obliquely downward, or in a fourth position biased from the third position at 90-degree angle where the IDC housing 21 has its opposing top wall facing rightward and its bottom wall facing left wall and its second hook grooves 24 respectively kept in engagement with the opposing top and bottom hook rods 14 and 15 of the respective modular jack engagement structure and the tilted modular plug insertion hole 224 kept extending obliquely rightward. If the IDC housings 21 of the modular jacks 20 are made having a square cross section and the window openings 13 are star shaped and respectively formed of two square holes 13a and 13b that are overlapped together and biased at a 45 degree angle relative to each other, as shown in FIG. 5, the modular jacks 20 can be installed in the face panel 11 in one of a large number of angular positions.

Figure 9:
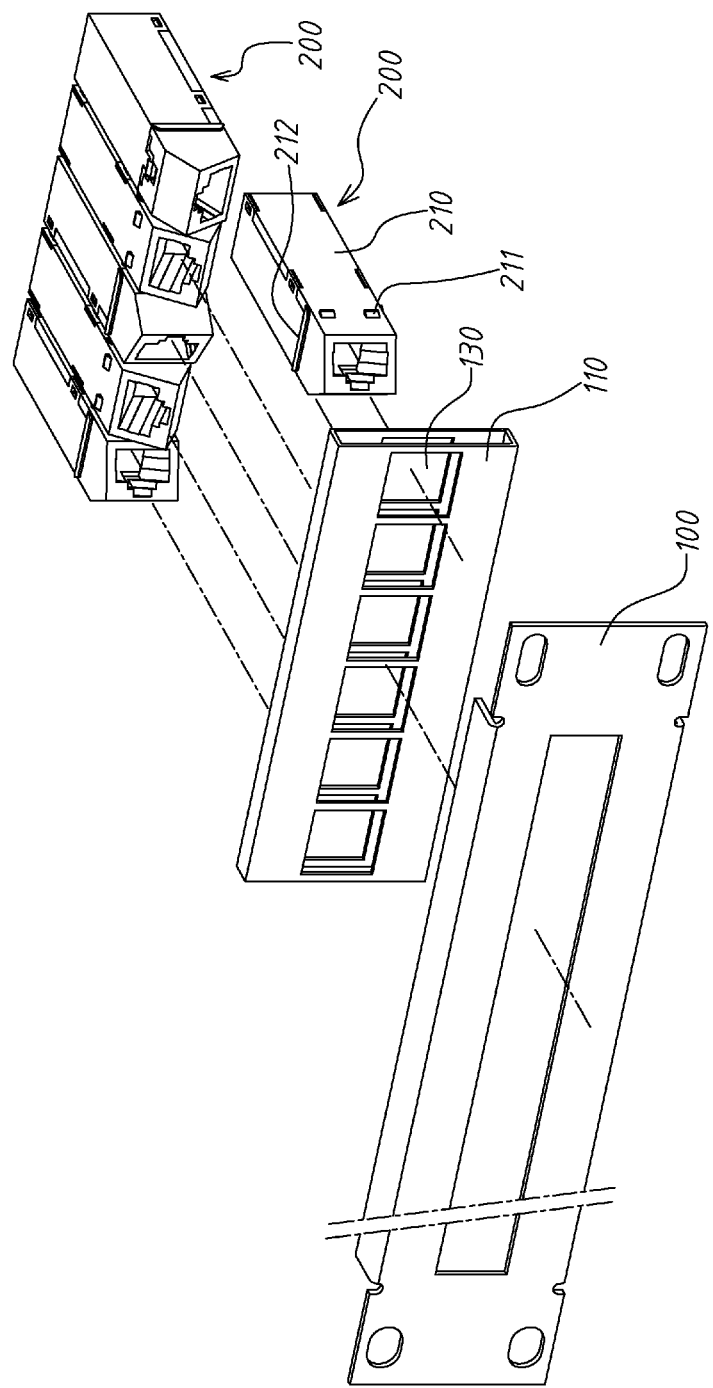
FIG. 9 is an exploded view of an alternate form of the multidirectional modular jack and face panel mounting structure in accordance with the present invention.

In an alternate form of the present invention, as shown in FIG. 9, the multidirectional modular jack and face panel mounting structure comprises a face panel 100, and a plurality of modular jacks 200 mounted in the face panel 100 in a row. This alternate form is substantially similar to that shown in FIGS. 1-8 with the exception that the window openings 130 of the face panel 100 are composite window openings; the IDC housing 210 of each modular jack 200 comprises a plurality of retaining blocks 211 located at opposing top and bottom walls thereof, and two transverse locating ribs 212 respectively located at two opposing sidewalls thereof.

Figure 10:
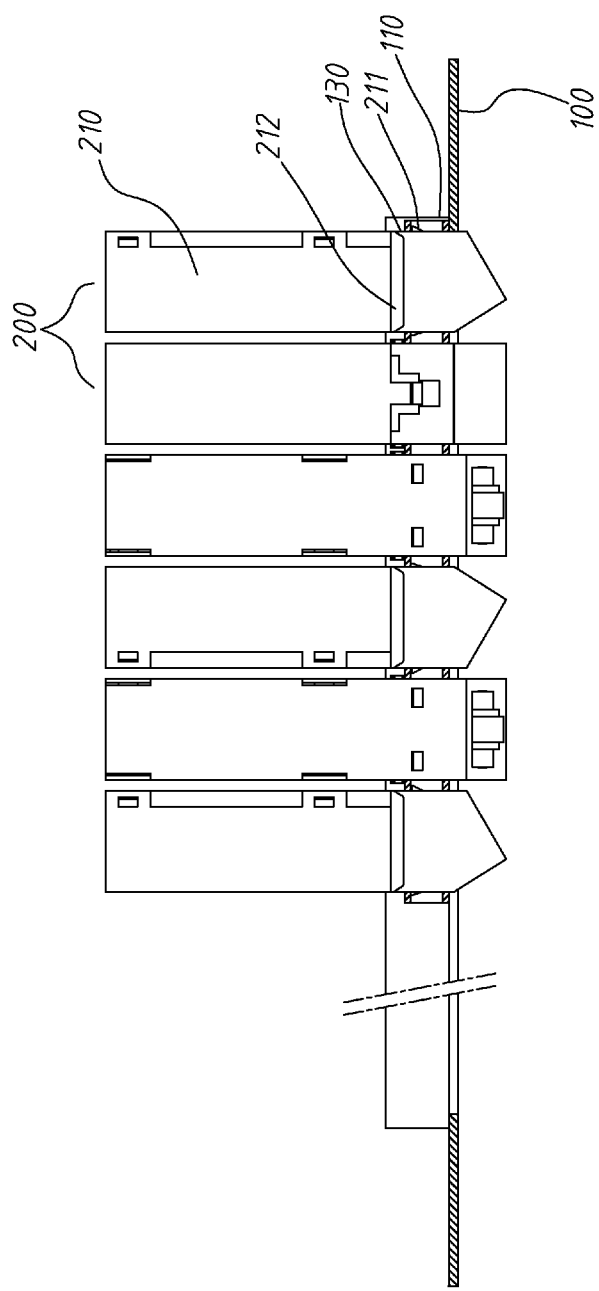
FIG. 10 is a sectional assembly view of FIG. 9.

When mounting the IDC housing 210 of one modular jack 200 in one composite window opening 130 of the back lining layer 110 of the face panel 100, the retaining blocks 211 are forced into engagement with the outer surface of the back lining layer 110 around the composite window opening 130, and the transverse locating ribs 212 are stopped at the inner surface of the back lining layer 110 around the composite window opening 130 (see FIG. 10).

In conclusion, the invention allows the user to install the modular jacks in the face panel in one of a series of angular positions to keep the tilted modular plug insertion holes of the respective modular jacks in different directions for the installation of respective mating modular plugs in different directions. When the invention is used in a network equipment, all the network cables can be properly arranged in different directions, avoiding network cable damage or tangled network cables.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A multidirectional modular jack and face panel mounting structure, comprising:

a face panel comprising a front face layer, at least one modular jack mounting hole and at least one modular jack engagement structure, each said modular jack mounting hole extending through said front face layer, each said modular jack engagement structure being disposed adjacent to one said modular jack mounting hole; and at least one modular jack respectively mounted in said at least one modular jack mounting hole of said face panel, each said modular jack comprising an IDC housing and at least one face panel engagement structure disposed between the front side and rear side of the respective said modular jack for engagement with said at least one modular jack engagement structure, said IDC housing comprising a modular plug insertion hole located at a front side thereof and exposed outside said front face layer of said face panel and an IDC terminal block located at a rear side thereof and holding a plurality of IDC terminals for the connection of core wires of an electrical cable, said IDC housing defining a first axial direction extending from the front side toward the rear side thereof and a second axial direction extending along a face of said modular plug insertion hole, said first axial direction and said second axial direction defining a predetermined contained angle between the IDC housing and said face of said modular plug insertion hole, said IDC housing having a cross section configured to fit said at least one modular jack mounting hole so that each said modular jack is mountable in one said modular jack mounting hole of said face panel, wherein said face of said modular plug insertion hole is located in one of four angular positions selected from a group of positions including rightward, leftward, upward, and downward; wherein said at least one modular jack includes at least three modular jacks located next to each other, each said face of said modular plug insertion hole of each modular jack of the at least three modular jacks is located in one direction of at least three different angular positions of the four angular positions.

2. The multidirectional modular jack and face panel mounting structure as claimed in claim 1, wherein said face panel further comprises a back lining layer fixedly mounted at a back side of said front face layer, said front face layer of said face panel comprising an elongated slot, said back lining layer comprising at least one window opening kept in communication with said elongated slot, each said window opening being combined with a part of said elongated slot to form one respective said modular jack mounting hole.

3. The multidirectional modular jack and face panel mounting structure as claimed in claim 2, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

4. The multidirectional modular jack and face panel mounting structure as claimed in claim 2, wherein each said window opening of said face panel is a composite window opening; each said face panel engagement structure of the IDC housing of each said modular jack comprises a plurality of retaining blocks located at opposing top and bottom walls thereof and forced into engagement with an outer surface of said back lining layer of said face panel around one said composite window opening, and two transverse locating ribs respectively located at two opposing sidewalls thereof and stopped at an inner surface of said back lining layer around the respective composite window opening.

5. The multidirectional modular jack and face panel mounting structure as claimed in claim 2, wherein said IDC housing and said at least one window opening being configured subject to a predetermined geometric shape, the geometric shape of said IDC housing matching the geometric shape of said at least one window opening.

6. The multidirectional modular jack and face panel mounting structure as claimed in claim 5, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

7. The multidirectional modular jack and face panel mounting structure as claimed in claim 5, wherein each said window opening of said face panel is a composite window opening; each said face panel engagement structure of the IDC housing of each said modular jack comprises a plurality of retaining blocks located at opposing top and bottom walls thereof and forced into engagement with an outer surface of said back lining layer of said face panel around one said composite window opening, and two transverse locating ribs respectively located at two opposing sidewalls thereof and stopped at an inner surface of said back lining layer around the respective composite window opening.

8. The multidirectional modular jack and face panel mounting structure as claimed in claim 5, wherein the geometric shape of said at least one window opening is a combination of the shape of two identical holes that are overlapped together and biased from each other at a predetermined angle.

9. The multidirectional modular jack and face panel mounting structure as claimed in claim 8, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

10. The multidirectional modular jack and face panel mounting structure as claimed in claim 8, wherein each said window opening of said face panel is a composite window opening; each said face panel engagement structure of the IDC housing of each said modular jack comprises a plurality of retaining blocks located at opposing top and bottom walls thereof and forced into engagement with an outer surface of said back lining layer of said face panel around one said composite window opening, and two transverse locating ribs respectively located at two opposing sidewalls thereof and stopped at an inner surface of said back lining layer around the respective composite window opening.

11. A multidirectional modular jack and face panel mounting structure, comprising:
a face panel comprising a front face layer, at least one modular jack mounting hole and at least one modular jack engagement structure, each said modular jack mounting hole extending through said front face layer and defining at least four sides, each said modular jack engagement structure being disposed adjacent to at least one side of one said modular jack mounting hole; and
at least one modular jack respectively mounted in said at least one modular jack mounting hole of said face panel, each said modular jack comprising an IDC housing and at least one face panel engagement structure for engagement with said at least one modular jack engagement structure, said IDC housing comprising a tilted modular plug insertion hole located at a front side thereof and exposed outside said front face layer of said face panel, said IDC housing being configured to fit the configuration of said at least one modular jack mounting hole;
wherein said tilted modular plug insertion hole of said at least one modular jack is located in one of four angular positions selected from a group of positions including rightward, leftward, upward, and downward;
wherein said at least one modular jack includes at least three modular jacks located next to each other, each said tilted modular plug insertion hole of each modular jack of the at least three modular jacks is located in one direction of at least three different angular positions of the four angular positions.

12. The multidirectional modular jack and face panel mounting structure as clamed in claim 11, wherein said at least one modular jack engagement structure of each said modular jack is disposed at least at two opposing sides of the at least four sides of the IDC housing thereof.

13. The multidirectional modular jack and face panel mounting structure as claimed in claim 12, wherein said face panel further comprises a back lining layer fixedly mounted at a back side of said front face layer, said front face layer of said face panel comprising an elongated slot, said back lining layer comprising at least one window opening kept in communication with said elongated slot, each said window opening being combined with a part of said elongated slot to form one respective said modular jack mounting hole.

14. The multidirectional modular jack and face panel mounting structure as claimed in claim 13, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

15. The multidirectional modular jack and face panel mounting structure as claimed in claim 13, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

16. The multidirectional modular jack and face panel mounting structure as claimed in claim 11, wherein said face panel further comprises a back lining layer fixedly mounted at a back side of said front face layer, said front face layer of said face panel comprising an elongated slot, said back lining layer comprising at least one window opening kept in communication with said elongated slot, each said window opening being combined with a part of said elongated slot to form one respective said modular jack mounting hole.

17. The multidirectional modular jack and face panel mounting structure as claimed in claim 16, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

18. The multidirectional modular jack and face panel mounting structure as claimed in claim 16, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

19. A multidirectional modular jack and face panel mounting structure, comprising:
- a face panel comprising a front face layer, at least one modular jack mounting hole and at least one modular jack engagement structure, each said modular jack mounting hole extending through said front face layer and defining at least four sides, each said modular jack engagement structure being disposed adjacent to one said modular jack mounting hole; and
- at least one modular jack respectively mounted in said at least one modular jack mounting hole of said face panel, each said modular jack comprising an IDC housing and a plurality of face panel engagement structures respectively disposed at at least four sides of said IDC housing for engagement with said at least one modular jack engagement structure, said IDC housing comprising a tilted modular plug insertion hole located at a front side thereof and exposed outside said front face layer of said face panel, said IDC housing being configured to fit the configuration of said at least one modular jack mounting hole;
- wherein said tilted modular plug insertion hole of said at least one modular jack is located in one of four angular positions selected from a group of positions including rightward, leftward, upward, and downward;
- wherein said at least one modular jack includes at least three modular jacks located next to each other, each said tilted modular plug insertion hole of each modular jack of the at least three modular jacks is located in one direction of at least three different angular positions of the four angular positions.

20. The multidirectional modular jack and face panel mounting structure as claimed in claim 19, wherein said face panel further comprises a back lining layer fixedly mounted at a back side of said front face layer, said front face layer of said face panel comprising an elongated slot, said back lining layer comprising at least one window opening kept in communication with said elongated slot, each said window opening being combined with a part of said elongated slot to form one respective said modular jack mounting hole.

21. The multidirectional modular jack and face panel mounting structure as claimed in claim 19, wherein each said modular jack engagement structure of said face panel comprises at least one hook rod located at a back side of said back lining layer adjacent to one said window opening; each said face panel engagement structure of the IDC housing of each said modular jack comprises at least one hook groove for engagement with said at least one hook rod of one said modular jack engagement structure.

22. The multidirectional modular jack and face panel mounting structure as claimed in claim 19, wherein each said window opening of said face panel is a composite window opening; each said face panel engagement structure of the IDC housing of each said modular jack comprises a plurality of retaining blocks located at opposing top and bottom walls thereof and forced into engagement with an outer surface of said back lining layer of said face panel around one said composite window opening, and two transverse locating ribs respectively located at two opposing sidewalls thereof and stopped at an inner surface of said back lining layer around the respective composite window opening.

\* \* \* \* \*